(12) United States Patent
Oeltjen et al.

(10) Patent No.: US 9,635,833 B2
(45) Date of Patent: May 2, 2017

(54) MODULAR, CONFIGURABLE, AND EXTENSIBLE ENCLOSURES FOR PETS AND OTHER PURPOSES

(76) Inventors: Jarret C. Oeltjen, Tallahassee, FL (US); James Montgomery, Tallahassee, FL (US)

( * ) Notice: Subject to any disclaimer, the term of this patent is extended or adjusted under 35 U.S.C. 154(b) by 1685 days.

(21) Appl. No.: 12/476,076

(22) Filed: Jun. 1, 2009

(65) Prior Publication Data
US 2010/0300371 A1    Dec. 2, 2010

(51) Int. Cl.
*A01K 1/03* (2006.01)
(52) U.S. Cl.
CPC .................................... *A01K 1/034* (2013.01)
(58) Field of Classification Search
CPC . A01K 1/034; A01K 1/02; A01K 1/03; A01K 1/033
USPC ....... 119/452, 455, 472, 473, 453, 482, 496, 119/474; 312/265.1–265.4, 4–6, 107, 312/108; 52/63, 222, 79.12, 584.1, 150; 135/121, 128, 143, 909, 913; 160/135, 160/229.1; 256/19, 24, 26
See application file for complete search history.

(56) References Cited

U.S. PATENT DOCUMENTS

| | | | | |
|---|---|---|---|---|
| 1,347,397 A | * | 7/1920 | Newman ....................... | 119/474 |
| 4,696,259 A | * | 9/1987 | Fewox .......................... | 119/482 |
| 4,819,582 A | * | 4/1989 | Lichvar ......................... | 119/474 |
| 4,917,047 A | * | 4/1990 | Wazeter, III .................. | 119/474 |
| 5,564,367 A | * | 10/1996 | Boyanton ..................... | 119/474 |
| 5,803,019 A | * | 9/1998 | Heilborn et al. ............. | 119/475 |
| 5,826,545 A | * | 10/1998 | Steffes et al. ................. | 119/473 |
| 5,967,089 A | * | 10/1999 | Allen ............................ | 119/474 |
| 7,111,584 B2 | * | 9/2006 | Wang ............................ | 119/502 |
| 7,681,524 B1 | * | 3/2010 | Hudson ........................ | 119/28.5 |
| 2003/0145799 A1 | * | 8/2003 | Hays et al. .................... | 119/502 |
| 2009/0032790 A1 | * | 2/2009 | Timms ........................... | 256/25 |
| 2009/0050865 A1 | * | 2/2009 | Napier ........................... | 256/37 |
| 2009/0188181 A1 | * | 7/2009 | Forbis et al. ................. | 52/173.1 |
| 2009/0314220 A1 | * | 12/2009 | Groh et al. .................... | 119/502 |

FOREIGN PATENT DOCUMENTS

DE       3842638 C1  *  7/1990  ............... A01K 1/03

OTHER PUBLICATIONS

Machine translation of DE 3842638 to Heidemann, published Jul. 1990.*

* cited by examiner

*Primary Examiner* — Kathleen Alker
(74) *Attorney, Agent, or Firm* — Patents on Demand P.A.; Brian K. Buchheit; Scott M. Garrett

(57) ABSTRACT

A pet enclosure kit can include multiple discrete flat panels and multiple panel connectors. Each panel can include joined edge segments forming a rigid perimeter of the panel. An area bound by the perimeter can include a mesh, where a weave of the mesh is sufficiently tight to restrain a pet for which a pet enclosure is constructed. Each panel connector can couple two adjacent panels together by connecting to an edge segment of each of the adjacent panels, each of the panels can be coupled using only the panel connectors to other ones of said panels at either approximately one hundred and eighty degree angle or approximately ninety degree angle relative to an adjacent panel. The panels and the panel connectors can be designed to construct multiple different configurations of pet enclosures. Each configuration can have a different height, width, or depth from other ones of the different configurations.

18 Claims, 9 Drawing Sheets

MODULAR, CONFIGURABLE, AND EXTENSIBLE ENCLOSURES FOR PETS AND OTHER PURPOSES

BACKGROUND OF THE INVENTION

The present invention relates to the field of modular, configurable, and extensible enclosures, which include pet enclosures.

Pet enclosures can be valuable to keep a pet safe from harm, from becoming lost, and/or to protect household artifacts, guests, and other animals from a pet's attention. A pet enclosure can be a standard part of a pet's habitat (i.e., many dogs often sleep in a cage) or can be used in special situations (e.g., traveling, having guests, etc.). Common pet enclosures include pet carriers, pet cages, and pet fences.

It can be a difficult challenge for pet owners to provide for both their personal comfort and their pet's comfort in regards to pet enclosures. Too small of a pet cage can severely restrict a pet's mobility and happiness. Too large of a pet cage can be unwieldy and cumbersome in a living space, especially for relatively cramped conditions, such as an apartment and/or condominium. This situation is exacerbated when multiple pets are involved, especially when these pets have to be separated from each other.

Additionally, an appropriate enclosure for a pet can vary based upon many non-static factors. For example, an enclosure size for a puppy or kitten is rarely appropriate for the same pet once it matures into a dog/cat. Additionally, when a person's living space changes (e.g., moving from an apartment to a house, from one apartment to another, etc.) desired characteristics for a pet enclosure can change in a corresponding fashion.

Most pet enclosures are relatively fixed structures. That is, even if they are able to be collapsed for storage, they are designed to be one size and configuration. As a result, when factors change, an owner is forced to either purchase a new and different pet enclosure or to continue to use an ill-suited one. Further, even a most suitable enclosure available can be less than ideal, as they are generally sold in fixed configurations, none of which may be optimal for a pet owner.

BRIEF SUMMARY

The disclosure teaches a modular enclosure, which is able to be constructed in different configurations utilizing standardized panels and fasteners. In one embodiment, the panels can be of a uniform size and joinable with other panels at either approximately 180 degree or approximately 90 degree angles. In this manner, a variety of rectangular enclosures can be dynamically created to any shape desired. Panels can be constructed using a mesh interior to enclosure an area defined by a panels edges. The fasteners can fasten two edges of panels to each other. Special panels can exist for doors, walkways, interior shelves, and the like. The enclosures can be designed for tool less assembly or for assembly using a minimal tool set. In one embodiment, the enclosures can be pet enclosures.

It should be appreciated that although many specifics presented herein are directed towards a pet enclosure, the disclosure is not limited in this regard and the disclosed enclosures can be utilized for any of a variety of purposes. In various embodiments, the enclosures can be utilized as modular furniture, bookcases, convention display units, entertainment center structures, and the like. Any artifact or structure able to be built from a series of panels and clamps, as described, are to be considered within scope of the disclosure.

One aspect of the present invention discloses a pet enclosure kit that includes multiple discrete flat panels and multiple panel connectors. Each panel can include joined edge segments forming a rigid perimeter of the panel. An area bound by the perimeter can include a mesh, where a weave of the mesh is sufficiently tight to restrain a pet for which a pet enclosure is constructed. Each panel connector can couple two adjacent panels together by connecting to an edge segment of each of the adjacent panels. Each of the panels can be coupled using only the panel connectors to other ones of said panels at either approximately one hundred and eighty degree angle or approximately ninety degree angle relative to an adjacent panel. The panels and the panel connectors can be designed to construct multiple different configurations of pet enclosures. Each configuration can have a different height, width, or depth from other ones of the different configurations.

Another aspect of the present invention discloses a pet enclosure formed from a set of discrete, flat panels and panel connectors. Joined edge segments of each of the panels can be round segments. Each panel connector can have a separable top section and bottom section. When coupling discrete panels, pressure can be consistently applied between the top section and bottom section of panel connectors (such as via a bolt connecting the two sections). Each of the top and bottom sections can include two half circle concave indentions. The half circle concave indentions of the top and bottom sections can be designed to snugly surround edge segments of two different panels when said top and bottom sections are joined.

Still another aspect of the present invention discloses a method for constructing a pet enclosure. In the method, a set of discrete flat panels can be coupled to each other using only panel connectors. Each panel connector can include a separable top section and bottom section, each of said top and bottom sections comprising two half circle concave indentions. A bolt can be inserted through the top section of each panel connector, which extends into a corresponding bottom section of the panel connector. For each panel connector, the bolt can be tightened. A tightened panel connector can enclose two different edge segments between the top section and the bottom section of each panel connector. The two different edge segments can be segments of two different and adjacent panels, which the panel connector couples. A polygon pet enclosure having at least four sides and an enclosed top can be constructed by connecting uniform sized ones of the panels to each other using only the panel connectors, wherein the constructed polygon pet enclosure is a rigid structure.

DETAILED DESCRIPTION

Figure 1:
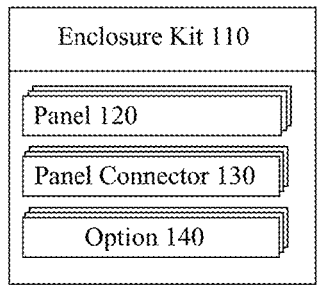
FIG. 1 is a schematic diagram of a pet enclosure kit in accordance with an embodiment of the inventive arrangements disclosed herein.
Figure 1:
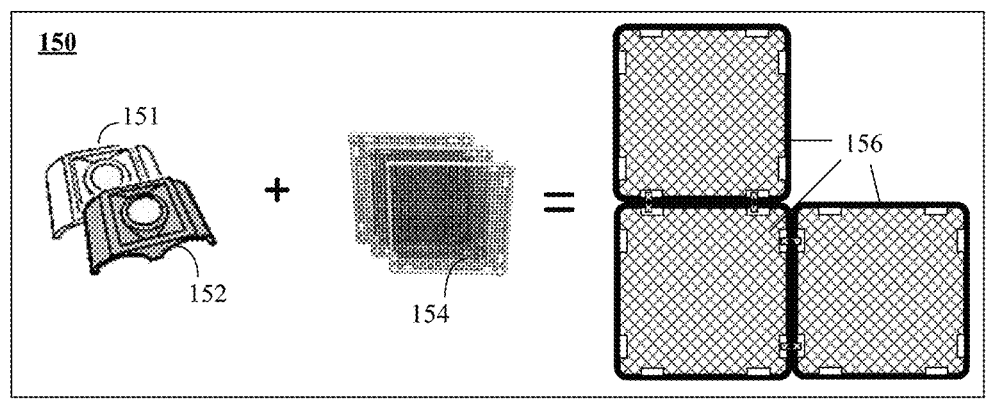
Figure 1:
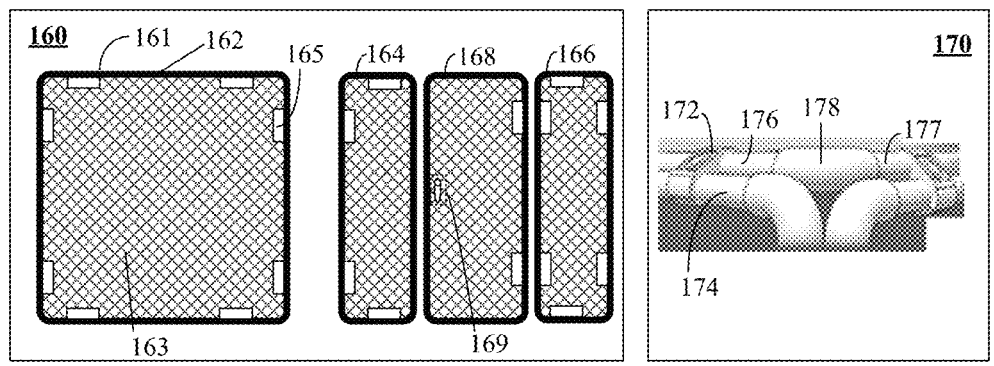
Figure 1:
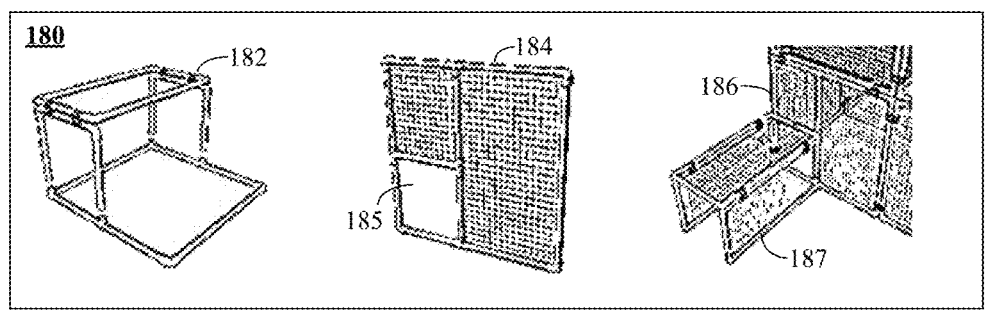
Figure 2A:
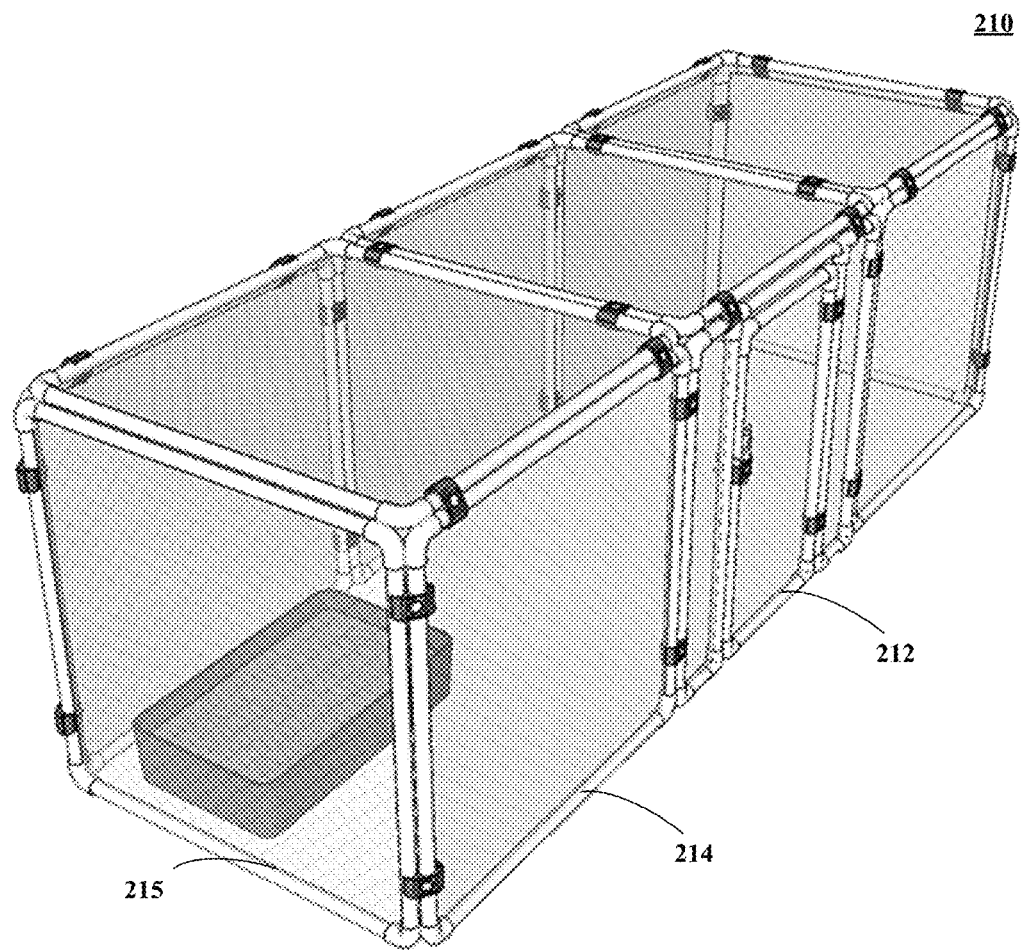
FIG. 2A-F illustrates numerous configurations of pet enclosures construed using modular panels and panel connectors in accordance with embodiment of the inventive arrangements disclosed herein.
Figure 2B:
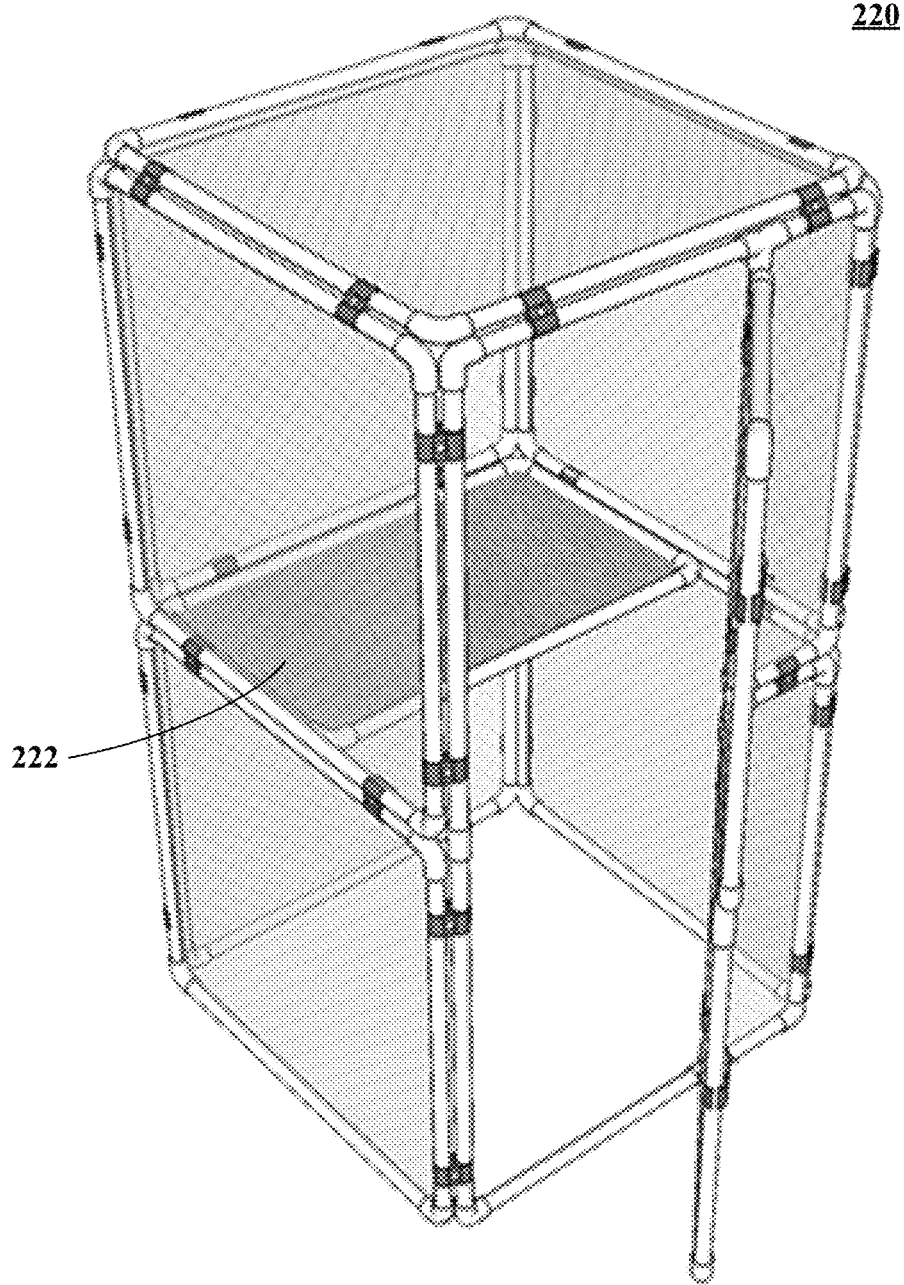
Figure 2C:
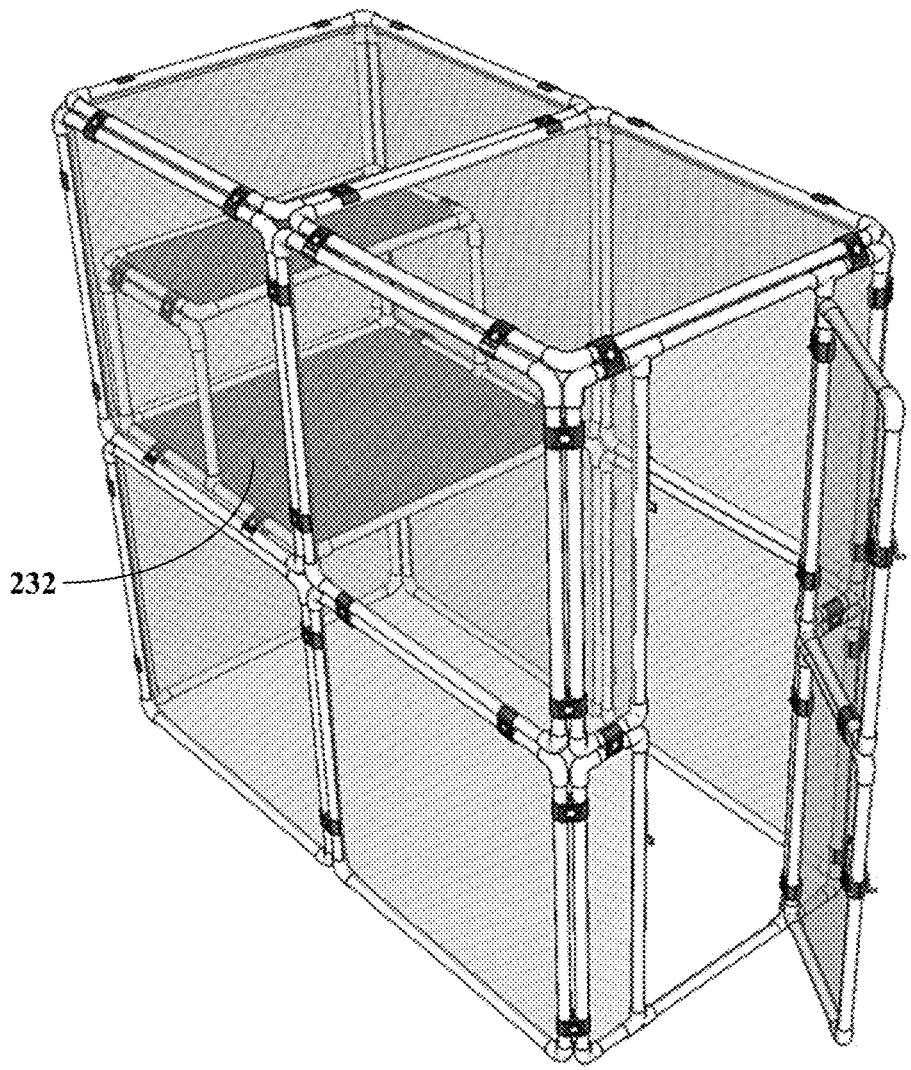
Figure 2D:
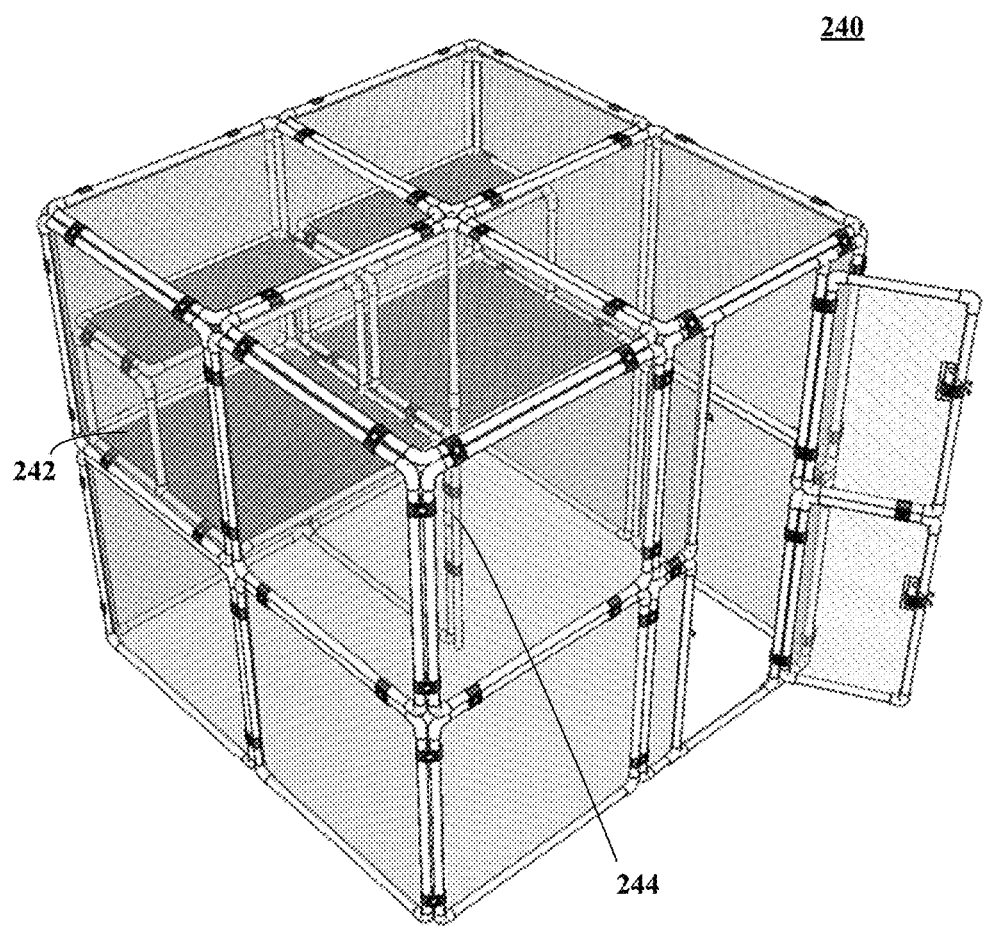
Figure 2E:
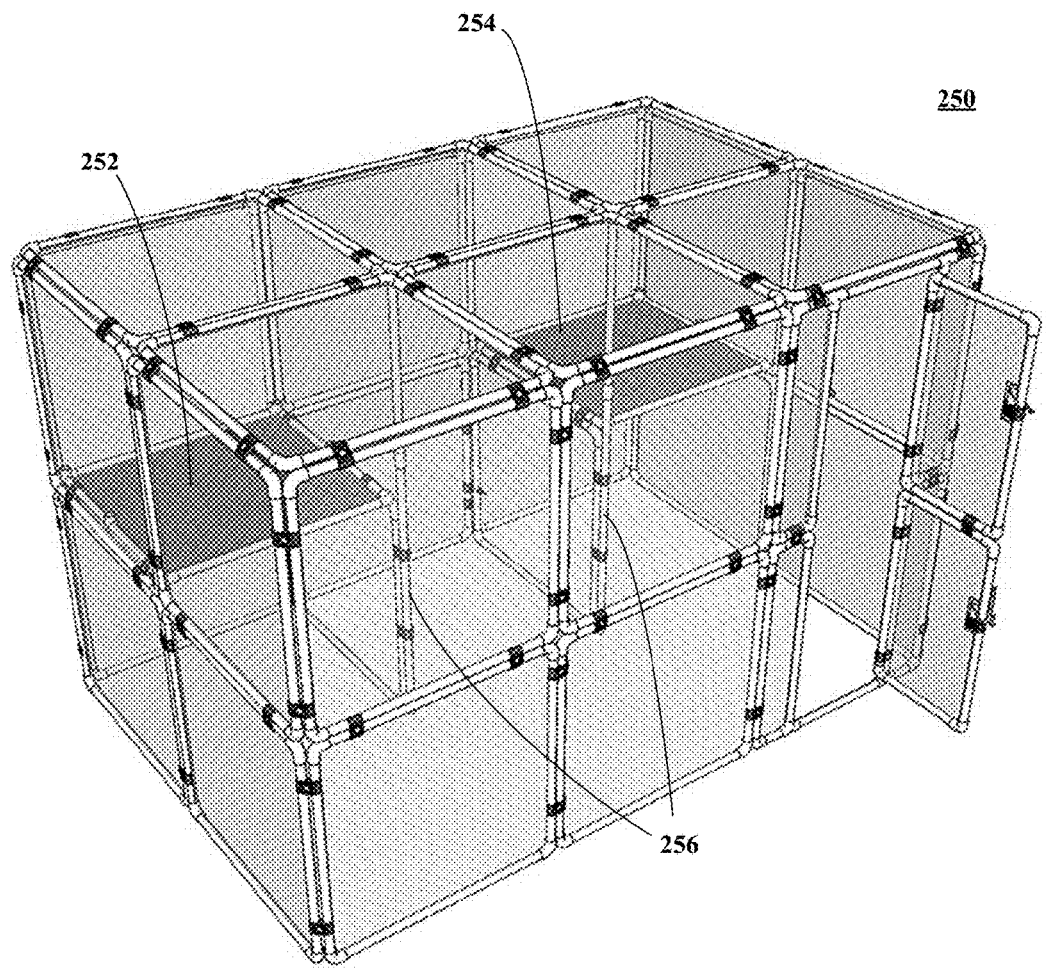
Figure 2F:
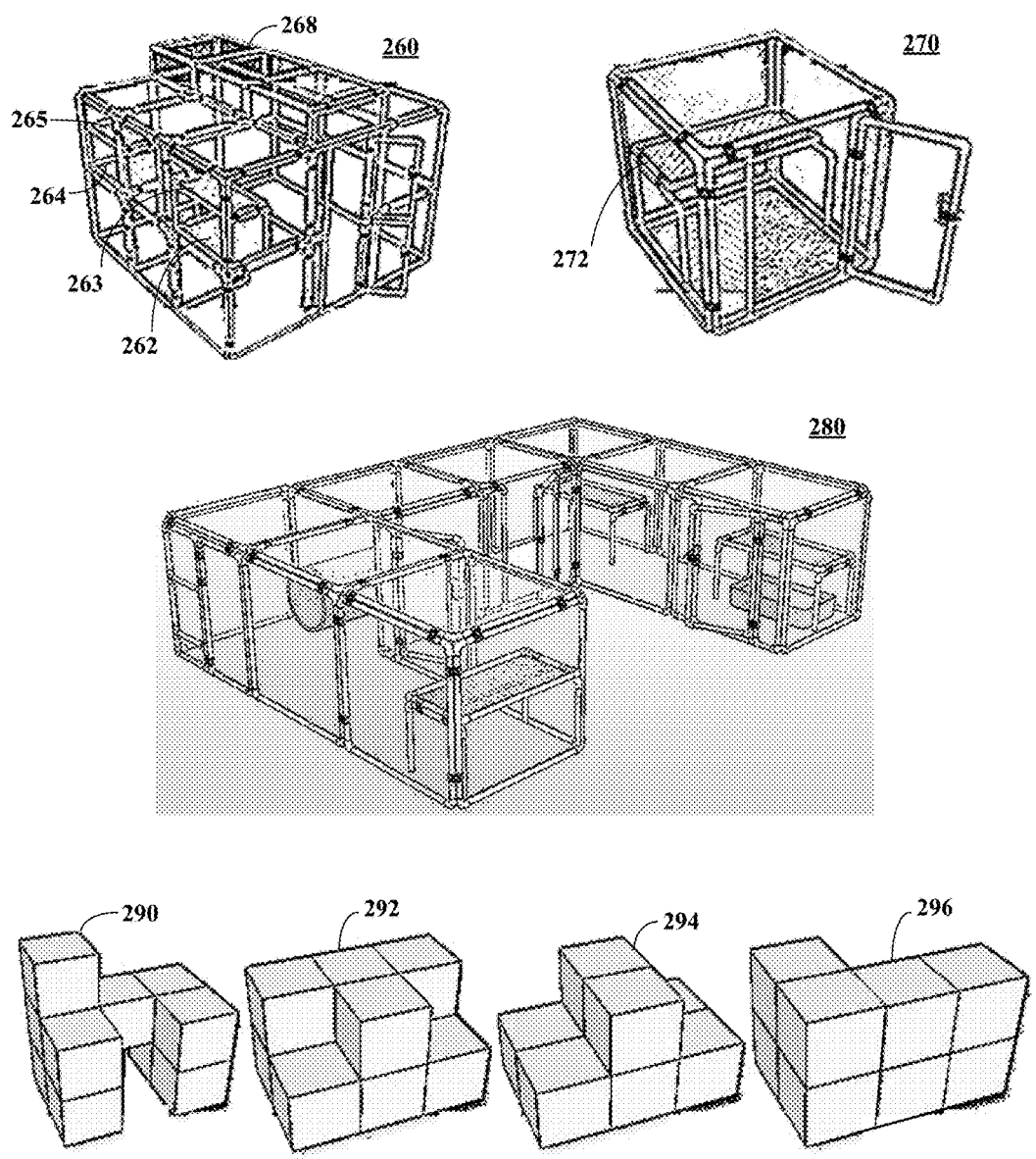

A modular enclosure constructed of a series of panels and panel connectors. These panels and connectors can be constructed in a myriad of configurations to suit a numerous needs. In one embodiment, for example, the enclosure can be a pet enclosure designed to suit a pet owner's situation. An "enclosure" is defined herein as including open sided structures, such as bookcases, conventional center displays, modular furniture (e.g., a table, night stand, entertainment system, etc.), and the like. Any structure able to be created from a series of interconnected panels and clamps described herein are to be considered "enclosures" as utilized herein.

When not in use, the panels and connectors can be stored in a relatively minimal amount of space. Should a larger and/or different configuration be desired for an enclosure, additional panels and panel connectors can be purchased, which can be used to extend an enclosure as desired. Interior panels functional as shelves, pet scratching posts, pet dividers, and the like can be optionally included. One or more doors can be included in the enclosure.

In one embodiment, each panel can be relatively rectangular and the panel connectors can be configured to attach the panels to one another at approximately parallel, perpendicular, or other angles. A perimeter or sides of each panel can be a relatively solid shape, possibly formed by a series of tube shaped segments. Use of tubular shared sides ensures few harsh or sharp edges exist to harm residents or pets. The interior area of each panel can be constructed of a sturdy see-through mesh, having sufficient strength and weave density to ensure a pet is unable to pass through the weave.

The present invention is described with reference to the attached figures, wherein similar reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention.

FIG. 1 is a schematic diagram of an enclosure kit 110 in accordance with an embodiment of the inventive arrangements disclosed herein. Each kit 110 can include a set of panels 120 and panel connectors 130. Zero or more options 140 can also be included in each kit. Each panel 120 can be approximately rectangular and can be designed to be joined to other panels 120 using the panel connectors 130. Panel connectors 130 can also connect one or more option 140 to panels 120. In one embodiment, the connectors 130 can connect the panels 120 using minimal (e.g., using only a screwdriver and/or Allen wrench) to no tools and using no additional mechanism. That is, the kit 110 can be a complete and comprehensive set of components for constructing a pet enclosure.

The components 120-140 of each kit 110 are designed in a modular fashion, which can allow an existing enclosures conforming to standards of a kit 110 to be extended by adding new panels 120, connectors 130, and options 140. Thus, when the kit 110 is used for constructing pet enclosures, a pet owner can create any of a variety of enclosures from one or more kits 110, so that the ultimate enclosure is suited for the pet, the space in which the enclosure is contained, and other situation specific circumstances. Panels 120 and options 140 can decompose into a set of approximate flat surfaces for ease of storage when kit components 120-140 are not in use.

While many different connectors 130 are possible for joining panels 120, in one embodiment, the connectors 130 can include two concavities (e.g., items 151, 152 of FIG. 1, item 310, 370, 380 of FIG. 3, item 432 of FIG. 4) each mating to a rounded edge of a different panel 120, which one of the connectors 130 attach. For example, the edge of a panel 120 can be PVC pipe, where the connectors 130 are glass filled (e.g., fiberglass strands) nylon. The percentage of fiberglass filling in a clamp can be greater than typical filled percentages (e.g., 15% glass filled), such as being thirty percent glass filled, which increases the strength of the clamp. In one embodiment, each concavity in a connector 130 can be less (e.g., about one mm) than the outer diameter of the panel edge, which the connector 130 surrounds. The material of the connector 130 can give slightly when opposing sides of the connector 130 are tightened about the panel edge. Thus, a tightened connector 130 can firmly attach two adjacent panels 120 is a fixed position. For this reason, it can be beneficial to initially construct panels 120 with non-tightened connectors 130 and to tighten once all panels 120 are interconnected to form an enclosure.

It is anticipated that a pet enclosure of a moderate size (e.g., embodiments 210, 220, 230, 240, 250, 260, 280 of FIG. 2A-F) can be constructed by a pet owner in approximately two hours or less using the kit 110, where after an initial setup it is anticipated that future construction time will be approximately half of the original time due to an expected learning curve. A constructed enclosure can be decomposed into component parts in approximately fifteen to thirty minutes.

Illustration 150 shows that panel connectors 130 of two different colors (light connector 151 or dark connector 152) can be selectively used to connect a set of panels 154 to form an enclosure consisting of a set 156 of panels 120. The set 156 of panels 120 can be connected vertically or horizontally relative to each other. The set 156 can also be connected by connectors 130 so that panels 120 are approximately orthogonal to each other. Angles between panels other than approximately (+/−five degrees) ninety degrees and other than approximately (+/−five degrees) one hundred and eighty degrees are possible. For example, six panels can be connected to each other in a hexagonal arrangement, where each panel is connected to each other at an approximately one hundred and twenty degree angle.

Figure 4:
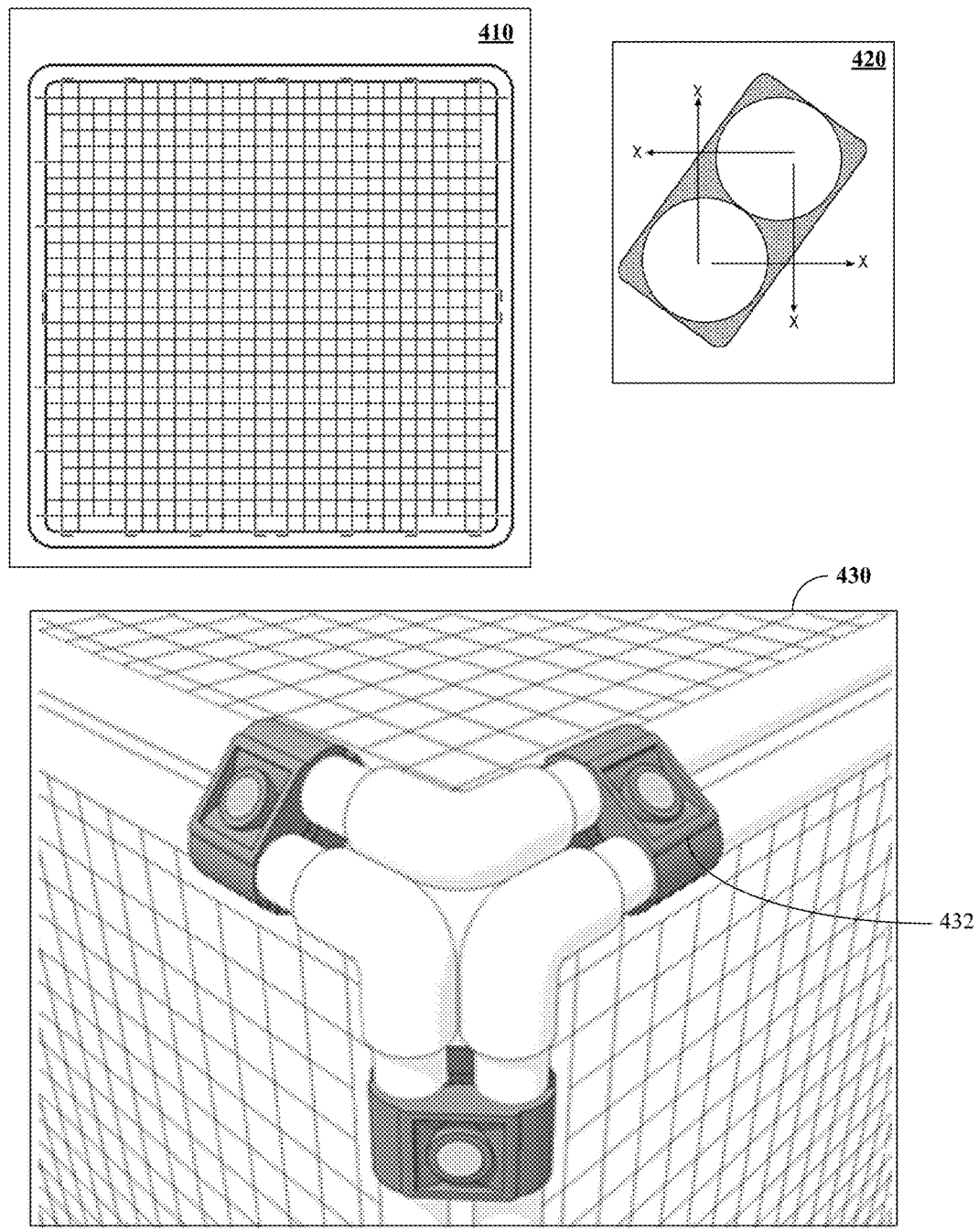
FIG. 4 is a schematic diagram of a system that shows views of a panel, a connector, and a joined region of three panels interconnected via fasteners in accordance with an embodiment of the inventive arrangements disclosed herein.

In one embodiment, at joined edges, edges and corners of the panels 120 can be slightly offset from each other, so that an angle of the joined edges and/or an angle of the connectors 130 is an approximately (+/−five degrees) forty five degree angle. For example, the angle between edge 174 and edge 176 can be approximately forty-five degrees. Illustration 430 of FIG. 4 shows a close-up of a corner formed from three orthogonally positioned panels 120. The relationship of the connector 130 and panel edges, when the approximately forty-five degree angle is formed, as a rigid approximately ninety degree corner, extremely strong and rigid corner results. At such a corner, the panels are prohibited from sliding relative to each other. The more panels are added to an enclosure in an interconnected fashion, the more rigid and strong the overall enclosure becomes.

Illustration 170 shows one configuration where a panel connector 172 is used to connect an edge 174 of one panel to an edge 176 of an adjacent panel. Each panel edge 174, 176 can be round and may be made of a variety of materials. In one embodiment, each edge 174, 176 can be round PVC pipe. A joint 178 can join the discrete segments 176, 177 of a panel to each other.

Illustration 160 shows a standard panel 161, two short panels 164, 166, and a door panel 168. Each panel 161, 164, 166, 168 has a mesh 163 interior. The mesh 163 can extend through the inner edge 162 of the panels. In one embodiment, galvanized after welding (GAW) wire that has been dipped in vinyl or other coating can be used for the mesh 163. In one embodiment, the mesh 163 can be bound/sealed within a hollow interior of the panel edges 162, in one configuration. For example, the edges 162 can be made out of hollow PVC pipe, which have bored holes within which a wire (e.g., the mesh 163) extends and is tied or otherwise bound within the interior of the PVC pipe. In one embodiment, the holes of the PVC pipe into which wire is inserted can be spaced approximately every four inches along the PVC pipe. This spacing can vary based upon a desired use of the enclosure and a required strength of the resulting mesh 163.

In one embodiment, the wires can be inserted into the holes of the edge 162 and bent in a manner to make it extremely difficult for the wires to be pulled out of the frame. Further, an inner filling can be inserted into the edge (e.g., the PVC pipe, for example) to prevent the bent wire from being removed. In one embodiment, the inner filling can be another PVC pipe having a smaller outer diameter than the inner diameter of the pipe into which it is inserted. Appreciably, the insertion of an inner pipe can be used to automatically bend wires extending through holes of outer pipe. In another embodiment, the inner filling can be a poured liquid, which hardens after pouring (e.g., an epoxy resin, liquid plastic, and the like). When the wire is coated, such as with a vinyl coating, the coating can "grab" the edges of the holes when the wire is bent, which can result in a taunt mesh 163.

The small panels 164, 166 can be joined with the door panel 168 via panel connectors 130 and/or special hinges to permit the door 168 to open and close. A non-limiting example of a hinged panel connector is shown in diagram 390. A length of the door panel 168 plus the side panels 164, 166 can equal a length of a standard panel 161 to ensure a "panel" (e.g., set of panels including a door panel) with a door is approximately the same dimensions as other panels of a pet enclosure. In one embodiment, the door panel 168 can include a latch 169, which can ensure the door panel 168 is able to remain closed when shut.

Illustration 180 shows a few contemplated options 140 able to be included in an enclosure kit 110 or purchased separately and used in conjunction with an enclosure kit 110. Option 182 shows an interior shelf, which can be included within any enclosure. The shelf 182 shows a half-height (of a panel 120) shelf, but other shelf heights are contemplated.

Option 184 shows a special panel with a pet door 185 built in. In various configurations, the pet door 185 can be paired to a building/apartment egress way, such as a pet door of an exterior door and/or sliding glass door. Option 186 shows a walkway 187 extending from a pet door.

The walkway 187 can be a great means for granting a pet a cozy nook, while minimizing consumed space within an environment. In one embodiment, a walkway 187 can be enclosed at an end to form a nook or extension for a pet. This nook can further include a liftable section, for situations when a litter box or other pet artifact requiring constant maintenance (e.g., food/water dispenser). Thus, the enclosure can be configured to minimize owner overhead.

In one embodiment, a walkway 187 can be used to join two disparate sections of a linked enclosure. For example, a walkway can be coupled to a pet door, which provides a corridor between an inside portion of a pet enclosure and an outside portion of the pet enclosure. An outside portion can be particularly important for some pet owners, who in absence of the enclosure would not be able to permit their pet outdoor access for safety reasons. For example, many apartment/condo owners have balconies, which in absence of an enclosure are unsafe for a pet, yet with an inclusion of an outdoor enclosure portion, provides safe, outdoor haven for an otherwise housebound pet.

In another embodiment, the walkway 187 can be an upper walkway or "flyway" for airborne pets (e.g., birds) or pets with a predisposition for heights/climbing (e.g., cats/ferrets). An upper walkway 187 can also be a means for creating additional headroom, as shown by configuration 260. Use of walkways 187 can be convenient points to add optional dividers, useful for situations where two or more pets are to share an enclosure, which do not necessarily cohabitate in a friendly manner. It should be noted that dividers exist for enclosures, which are not (necessarily) associated with a walkway 187.

The options 140 of illustration 184 are not intended to be exhaustive, but are intended to show that enclosures can be modified using components other than basic panels 120 and connectors. Other contemplated options 140 can include, but are not limited to, a pet divider, an enclosure floor/ceiling, a litter box, a food/water dispenser, a pet run, a scratching post, and the like. In one embodiment, the ceiling/floors for an enclosure can include a set of panels 120. For example, a one panel floor can be covered with a surface (possibly attached to the mesh and/or sides of the panel), which is designed to protect a pet's feet/paws and/or designed for ease of clean-up. In another embodiment, a floor/ceiling can be designed of different material attached to the mesh and/or sides of proximate panels. For example, a floor can be added to an outdoor dog enclosure to prevent a pet from tunneling/digging its way out of the bottom of the enclosure, which is common for some breeds. Of course in embodiments where enclosure kit 110 is for modular furniture or some purpose other than pet containment, the options 180 can be modified accordingly. For example, an optional glass/fabric/wood door can exist for when the enclosure kit 110 is used to make bookcases or end tables. Similarly, "sides" attachable to the panels 120 can be used to change a color of modular furniture, to make portions of a constructed structure opaque, to provide a rigid surface (e.g., shelves) for supporting included objects, etc.

FIG. 2A-F illustrate numerous configurations of pet enclosures construed using modular panels and panel connectors in accordance with embodiment of the inventive arrangements disclosed herein. The configurations shown are not intended to be exhaustive, but are instead intended to illustrate the extensibility and adjustability of the modular components that form the pet enclosures.

Configuration 270 is a basic configuration having four sides and a top, each consisting of one panel exempting the door "panel." The door is hinged, which permits it to swing open and closed. Opposite the hinge is a latch, which keeps the door panel in a closed position when engaged. Configuration 270 includes a half shelf 272 option. In one embodiment, (assuming a standard panel is 31 inches by 31 inches) configuration 270 can have a height of 31 inches, a depth of 31 inches, and a width of 31 inches.

Configuration 270 can be suitable for a small pet needing to be contained in an enclosure for a short period in a space limited environment. Configuration 270 is also one of the most economic models, which can be purchased as a "starter" enclosure for a young pet, which is expected to be expanded as the pet grows into adulthood and needs additional space.

Configuration 210 is for a low enclosure one panel high and three panels wide. As shown, it includes a single door 212, which can be positioned at any point in the enclosure. That is, the door 212 assembly (including the door itself and side panels) is the same width and height as other ones of the enclosure panels. Thus, the door 212 assembly panel can be positionally swapped with panel 214 or 215, which results in the same basic enclosure of configuration 210, with a door 212 positioned differently. Thus, a kit for constructing configuration 210 inherently permits the assembler to customize elements of the configuration 210.

Configuration 220 shows an enclosure two panels high that includes an interior pet shelf 222 that is one panel high. In one embodiment, (assuming a standard panel is 31 inches by 31 inches) configuration 220 can have a height of 62 inches, a depth of 31 inches, and a width of 31 inches.

Configuration 230 shows an enclosure two panels high, two panels deep, and one panel wide that includes a two-tiered interior pet shelf 232 that is one panel high at the top tier.

Configuration 240 shows an enclosure two panels high, two panels deep, and two panels wide that includes an optional interior pet shelf 242 that is one panel high. Configuration 240 also includes an interior support 244, which supports the enclosure's ceiling. Structural supports (similar to support 244) can be added to any configuration as needed. These supports connect to the panels using the standard connectors/clamps, which are used to connect panels to each other.

Configuration 250 shows an enclosure two panels high, two panels deep, and three panels wide that includes optional interior pet shelves 252 and 254. Similar to configuration 240, configuration 250 includes ceiling supports 256.

Configuration 260 shows an enclosure two panels high, three panels deep, and three panels wide. A central corridor 268 (e.g., a center walk seventy-five inches high) of configuration 260 is extended by a walkway to permit a relatively tall person to stand in the corridor without hunching. Two optional single panel high and wide shelves 262, 264 are shown, each having an additional half shelf 263, 265 over it. Not only is the central corridor 268 useful for adding height, but it is also a support member, which adds to the strength of the enclosure. Similar in configuration 240 and 250, additional ceiling support elements can be included in configuration 260.

Configuration 280 shows a "U" shaped low enclosure, one panel high, with three panels on each side of the "U" connected by a corridor four panels long. Configuration 280 includes multiple half height shelves and doors.

Configurations 290-296 are abstract configurations for user configurable enclosure shapes. That is, a user can specify a custom enclosure 290-296 at a time of ordering, and a kit can be constructed that includes necessary panels and connectors to create that custom enclosure. In one embodiment, the customized configurations 290-296 can be created via a Web based application linked to an e-commerce Web site. That is, a user accessing the e-commerce Web site can via a browser, create a custom configuration 290-296, where an automated software program running on computing equipment linked to the Web server can automatically determine components for constructing the user specified configuration 290-296, and their respective costs. Additional options, such as a number and position of doors, shelves, etc. can also be user selected via the browser, which causes adjustments to be made in the enclosure kit cost. In another embodiment, the configurations 290-296 can be manually established (e.g., faxed, mailed, etc. to the kit company) and kit components can be determined by partially manual means.

It should be appreciated that these configurations 210-296 can be adjusted based upon circumstances and a desired environment. For example, configuration 250 can be modified so that it is half inside and half outside a dwelling. A walkway or pet door can be used to join the two different sections. Thus, different configurations of enclosures 250 can permit a pet to safely choose to be either inside or outside a home, depending upon whether and/or pet mood.

Although the configurations 210-296 shown include ceilings, the panels can be connected by panel connectors to create an open fence/enclosure lacking a top. For example, six panels can be connected along a common plane at approximately one twenty degrees from each other to form a regular hexagonal, open enclosure. Five panels can be connected at approximately one hundred and eight degrees to form a regular pentagon, shaped open enclosure.

In one embodiment, travel attachments can be included with a pet enclosure. For example, a handle, wheels, and/or a tow hand-hold can be attachments able to be added to different configurations of a pet enclosure. Thus, the panels and connectors can form a pet carrier, a vehicle "bed", and other types of travel specific enclosures.

Although, as a reference point, the panels are described as being 31 inches per side, the panels and/or connectors can be scaled as desired. For example, smaller scaled panels (e.g., each panel being approximately 5 inches) can be suitable for constructing enclosures for a guinea pig, mouse, or other small pet.

Figure 3:
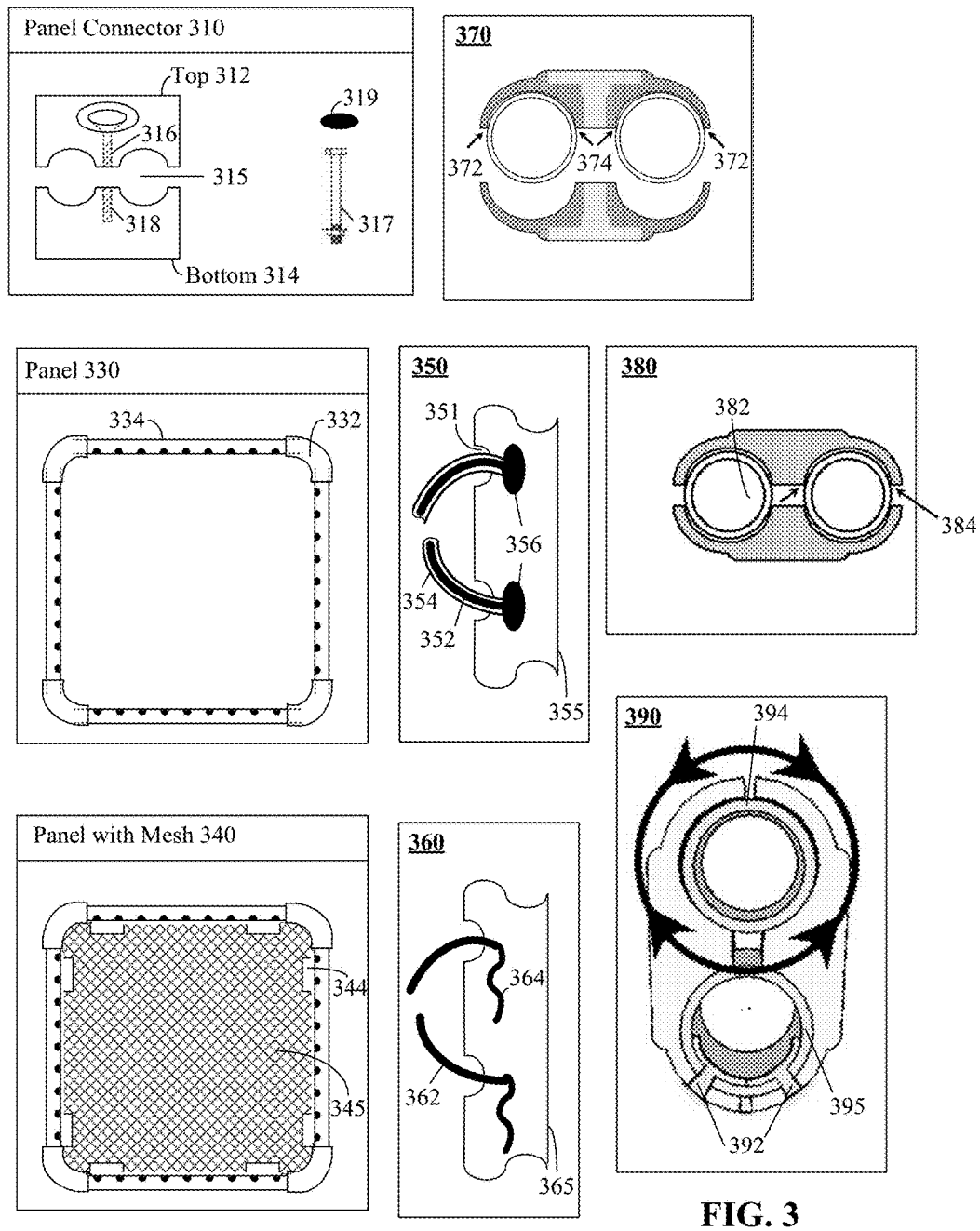
FIG. 3 is a schematic diagram of a system that shows additional details specific to panel connectors and panels in accordance with an embodiment of the inventive arrangements disclosed herein.

FIG. 3 is a schematic diagram of a system 300 that shows additional details specific to panel connectors 310 and panels 330 in accordance with an embodiment of the inventive arrangements disclosed herein.

Panel connector 310 shows one embodiment for a connector that connects two panels to each other. As shown, the panel connector 310 includes a top 312 and a bottom 314 portion. Hole 315 is a region between the top 312 and bottom 314 portion, within which panel edges or perimeter segments fit. The region about the hole 315 can be padded by an optional non-slip material to ensure a snug and stable coupling occurs between the connectors 310 and edge segments of the panels 330.

It should be appreciated that the panel connector 310 can be referred to as a "slip clamp" in one embodiment, since connector 310 is able to be positioned along a range of an edge. The range is defined by a pre-cut section (e.g., section 344 and 165) in the mesh, which can be re-enforced for strength. That is, the length of the precut section is greater than a length of a panel connector 310, which grants a level of "slideable" leeway when attaching the connectors 310 to the panels 330, 340.

The two different portions 312, 314 of a panel connector 310 can be joined using a bolt 317 (or other fastening mechanism, such as a with threads mated to a pre-bored region of the connector), which is designed for a pre-bored region 316, 318. Grooves pre-drilled into the top 312 and bottom 314 can be matched to the screw, so that inserting the screw into the top 312 and tightening it, results in the top 312 and bottom 314 being joined. The top 312 portion can be countersunk in one embodiment. Additionally, an optional top seal or cover 319 can be placed on the top 312 after the bolt 317 is tightened.

Diagram 370 and 380 show an exaggerated example of how a panel connector grabs an edge of the panel at exterior 372, 384 and interior 374, 382 points. As previous mentioned the total diameter of a concavity of the panel connectors, as shown in diagram 370 and 380, can be less (e.g., one mm when standard diameter PVC pipe is used) than the diameter of the panel edges to ensure a snug fit.

Diagram 390 shows a special panel connector for use as a door hinge. The door hinge, panel connector can include one inner ring 394, which is able to be rotated in three-hundred and sixty degree manner. A second ring 395 of the door hinge can be non-rotatable. The top and bottom portions of the door hinge can be attached using rivets 392, which cause the two pieces of the hinge to be affixed at a slight angle, expanding from the fixed bottom ring 394 to the rotating top ring 395 of the panel connector. Once the rivets 392 are inserted, a bolt 317 can be extended through both halves of the connector and tightened. Tightening can be with less pressure than when joining a standard panel connector 310 to prevent possible damage to the door hinge, which may result from over-tightening.

Panel 330 shows how straight segments 334 are combined with joints 332 to form a perimeter of a panel 330. Each segment 334 can include multiple inwardly facing holes, through which a material that forms a mesh 345 can pass and be secured, as shown by panel with mesh 340.

Illustration 350 shows one contemplated mechanism for securing the mesh 345 to the sides of a panel. In the illustration 350, the mesh can be formed from a set of wires 352, each being coated 354 for enhanced strength and safety. For example, the wire 352 can be galvanized after welding (GAW) stainless steel coated 354 with vinyl. The coated wire extends through a hole 351 of a panel segment 355. In one embodiment, a binding 356 that is larger than the hole 351 can ensure the wire 352 remains attached to the segment 355.

Other attachment mechanisms and techniques are contemplated. For example, illustration 360 shows how a wire 362 can pass into a panel segment 365, where it is bent 364. All wires can be bent 364 in a common direction. In one embodiment, a core, such as a second PVC pipe can be inserted into the panel segment 365 to ensure the wires 362 are unable to slip out of the holes into which they are inserted. In another embodiment, a fill material, such as a liquid material that hardens once inserted, can be used to fill the interior of the panel segment 365 to prevent wire 362 slippage. In one embodiment, hooks, loops, and other fasteners can be attached to the panel segment sides and used to secure the mesh. Hence, not all contemplated embodiments require the wire or other mesh material to pass into the interior of the panel.

Many different materials can be used for the panel connectors 310, panel sides, and mesh. In one implementation, panel sides can be made of furniture grade PVC, the mesh can be made from GAW wire coated with vinyl, and panel connectors 310 can be made of nylon with 30 percent fiberglass fill. Bolts 317 can be stainless steel. These materials result in an extremely sturdy, lightweight pet enclosure that is well suited for indoor or outdoor environmental conditions. These materials are for illustrative purposes only, and one of ordinary skill can recognize that different materials can be used, depending upon desired strength, material costs, and aesthetic considerations.

FIG. 4 is a schematic diagram that shows views of a panel 410, a connector 420, and a joined region 430 of three panels interconnected via fasteners in accordance with an embodiment of the inventive arrangements disclosed herein.

The panel 410 is an embodiment that shows a number of wires that extend into a PVC edge of a panel, the direction in which the wires are bent, and a placement of regions along which a slip clamp is to be mounted. As shown, the bend of the wires can vary within a single panel segment. For example, all inserted wires in the top and bottom edges of the panel 410 are bent towards the center of the panel. An identical scheme can be utilized for the horizontal edges of the panels or a different bend pattern can be used.

Diagram 420 is shown to illustrate benefits of offsetting panel edges when utilizing the connectors to create an approximately forty five degree angle at the connection point. This results in a very strong and rigid structure, when the clamps/connectors are tightened because the panel edges are prohibited in sliding in any of the directions of the arrows shown in diagram 420.

Joined region 430 shows a view of a corner, where three different panels are joined at orthogonal angles to each other. At each join points, the connectors are angled at approximately forty five degrees, which overall results in a very rigid and strong enclosure, once all panels have been joined.

The breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings.

In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention can have been disclosed with respect to only one of several implementations, such feature can be combined with one or more other features of the other implementations as can be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

What is claimed is:

1. A pet enclosure kit comprising:
a plurality of discrete, flat panels, each panel consisting of exactly four straight segments of PVC pipe and four corner segments of PVC pipe, wherein each of the four straight segments of PVC pipe is orthogonally connected to another of the straight segment of PVC pipe via one of the corner segments, wherein each corner segment connects exactly two of the four straight segments of PVC pipe, wherein the four straight segments of PVC pipe and four corner segments of PVC pipe are joined to each other to form a rigid perimeter of the panel, wherein an area bound by said perimeter comprises a mesh, wherein a weave of the mesh is sufficiently tight to restrain a pet for which a pet enclosure is constructed from said pet enclosure kit; and
a plurality of panel connectors, each panel connector couples two adjacent panels together by connecting to an edge segment of each of the adjacent panels, wherein each of said panels are coupled using only the panel connectors to other ones of said panels at either approximately one hundred and eighty degree angle or approximately ninety degree angle relative to an adjacent panel, and wherein said plurality of panels and said panel connectors construct a plurality of different configurations of pet enclosures, each configuration having a different height, width, or depth from other ones of the different configurations, wherein each configuration uses at least five different ones of said plurality of discrete, flat panels to form sides of one of the pet enclosures and an additional at least one of the discrete, flat panels to form a top of one of the pet enclosures, wherein each of the different configurations of the pet enclosures provide a continuous volume through which an enclosed pet is able to roam through the continuous volume of that specific pet enclosure, wherein for each of the different configurations, at least one of the plurality of discrete flat panels is joined to another of the discrete flat panels on a single side by the approximately a one hundred and eighty degree angle.

2. The pet enclosure kit of claim 1, wherein each full sized panel of the plurality of panels is of uniform height and width and connects to an adjacent full sized panel using exactly two of said panel connectors.

3. The pet enclosure kit of claim 1, wherein each of said different configurations comprises a rectangular pet enclosure having three sides and a top formed by uniform sized ones of the panels, wherein a fourth side of the rectangular pet enclosure comprises three panels having an equivalent height of the uniformed sized ones, wherein a sum of the widths of the three panels when joined approximately equals a width of the uniformed sized ones, wherein two of said three panels have an approximately equivalent width to each other and wherein a third of said three panels has a width greater than the other two of said three panels, wherein said third of said three panels is placed between the other two of the three panels, and wherein said third panel is a hinged door of said rectangular pet enclosure.

4. The pet enclosure kit of claim 1, wherein the edge segment of each of the adjacent panels are round segments, wherein each side of said perimeter consists of a single round segment joined to another single round segment using a round joint, wherein a diameter of said round joints are greater than a diameter of each of said single round segment, wherein each joint slips over each single round segment.

5. The pet enclosure kit of claim 1, wherein the edge segment of each of the adjacent panels are formed from hollow PVC pipe, wherein said mesh is formed from a coated wire, which extends through holes of said PVC pipe and is bound within the hollow interior of the PVC pipe.

6. The pet enclosure kit of claim 1, each panel connector having separable top section and bottom section, which when coupling discrete panels together applies pressure between the top and bottom sections, wherein each of said top and bottom sections comprise two half circle concave indentions, wherein each of said edge segments are round, and wherein said half circle concave indentions of said top and bottom sections snugly surround edge segments of two different panels when said top and bottom sections are joined.

7. The pet enclosure kit of claim 6, wherein said top section comprises a central hole bored between the two half circles extending through the top section, wherein said bottom section comprises a central hole bored between the two half circles extending at least partway through the bottom section, wherein the central hole of said top section and said bottom section is permit a screw to be inserted, wherein said screw is a mechanism used to join said top section and said bottom section.

8. The pet enclosure kit of claim 1, wherein each panel connector comprises two concavities, each for coupling to a different rounded panel edge, wherein each concavity has a depth less than an outer radius of the rounded panel edge.

9. The pet enclosure kit of claim 1, further comprising:
an enclosure option, wherein said enclosure option comprises at least one of a pet shelf and a pet walkway, wherein said enclosure option is attached to said panels utilizing only said panel connectors.

10. The pet enclosure kit of claim 1, wherein each of said panels comprises a plurality of precut sections in the mesh, wherein said pre-cut sections permit said panel connectors to be connected about the edge segments without being hampered by said mesh, wherein a length of each precut section is greater than a length of said panel connector which provides a slidable range of positions for the panel connectors to be placed about a region defined by the precut sections.

11. A pet enclosure comprising:
a plurality of discrete, flat panels, each panel consisting of exactly four straight segments of PVC pipe and four corner segments of PVC pipe, wherein each of the four straight segments of PVC pipe is orthogonally connected to another of the straight segment of PVC pipe via one of the corner segments, wherein each corner segment connects exactly two of the four straight segments of PVC pipe, wherein the four straight segments of PVC pipe and four corner segments of PVC pipe are joined to form a rigid perimeter of the panel, wherein an area bound by said perimeter comprises a mesh, wherein a weave of the mesh is sufficiently tight to restrain a pet for which the pet enclosure is constructed; and
a plurality of panel connectors, each panel connector couples two adjacent panels together by connecting to an edge segment of each of the adjacent panels, wherein each of said panels are coupled using only the panel connectors to other ones of said panels at either approximately one hundred and eighty degree angle or approximately ninety degree angle relative to an adjacent panel, each panel connector having separable top section and bottom section, which when coupling discrete panels together applies pressure between the top section and bottom section, wherein each of said top and bottom sections comprise two half circle concave indentions, and wherein said half circle concave indentions of said top and bottom sections snugly surround edge segments of two different panels when said top and bottom sections are joined, wherein the pet enclosure uses at least five different ones of said plurality of discrete, flat panels to form sides of one of the pet enclosures and an additional at least one of the discrete, flat panels to form a top of one of the pet enclosures, wherein the pet enclosure provides a continuous volume through which an enclosed pet is able to roam through the continuous volume of that specific pet enclosure, wherein for the pet enclosure at least one of the plurality of discrete flat panels is joined to another of the discrete flat panels on a single side by the approximately a one hundred and eighty degree angle.

12. The pet enclosure of claim 11, wherein said pet enclosure is a rectangular pet enclosure having three sides and a top formed by uniform sized ones of the panels, wherein a forth side of the rectangular pet enclosure comprises three panels having an equivalent height of the uniformed sized ones, wherein a sum of the widths of the three panels when joined approximately equals a width of the uniformed sized ones, wherein two of said three panels have an approximately equivalent width to each other and wherein a third of said three panels has a width greater than the other two of said three panels, wherein said third of said three panels is placed between the other two of the three panels, and wherein said third panel is a hinged door of said rectangular pet enclosure.

13. The pet enclosure of claim 11, wherein said edge segments are formed from hollow PVC pipe, wherein said mesh is formed from nylon coated galvanized after welding wire, which extends through holes of said PVC pipe and is bound within the hollow interior of the PVC pipe.

14. The pet enclosure of claim 13, wherein each panel connector is formed from nylon with at least fifteen percent fiberglass fill.

15. The pet enclosure of claim 11, wherein said top section of each of said panel connectors comprises a central hole bored between the two half circles extending through the top section, wherein said bottom section comprises a central hole bored between the two half circles extending at least partway through the bottom section, wherein the central hole of said top section and said bottom section permit a screw to be inserted, wherein said screw is a mechanism used to join said top section and said bottom section.

16. The pet enclosure of claim 11, further comprising:
an enclosure option, wherein said enclosure option comprises at least one of a pet shelf and a pet walkway, wherein said enclosure option is attached to said panels utilizing only said panel connectors.

17. The pet enclosure of claim 11, wherein each of said panels comprises a plurality of precut sections in the mesh, wherein said pre-cut sections permit said panel connectors to be connected about the edge segments without being hampered by said mesh, wherein a length of each precut section is greater than a length of said panel connector which provides a slidable range of positions for the panel connectors to be placed about a region defined by the precut sections.

18. A pet enclosure comprising:
a plurality of discrete, flat panels, each panel consisting of exactly four straight segments of PVC pipe and four corner segments of PVC pipe, wherein each of the four straight segments of PVC pipe is orthogonally connected to another of the straight segment of PVC pipe via one of the corner segments, wherein each corner segment connects exactly two of the four straight segments of PVC pipe, wherein the four straight segments of PVC pipe and four corner segments of PVC pipe are joined to form a rigid perimeter of the panel, wherein an area bound by said perimeter comprises a mesh, wherein a weave of the mesh is sufficiently tight to restrain a pet for which the pet enclosure is constructed;
a plurality of panel connectors, each panel connector couples two adjacent panels together by connecting to an edge segment of each of the adjacent panels, wherein each of said panels are coupled using only the panel connectors to other ones of said panels at either approximately one hundred and eighty degree angle or approximately ninety degree angle relative to an adjacent panel; and
at least one door panel for a side of the pet enclosure, wherein the at least one door panel comprises twelve corner segments of PVC pipe, four T connectors of PVC pipe, and eighteen straight segments of PVC pipe, wherein the at least one door panel and a portion of the plurality of the discrete flat panels are joined to form two of the four sides, wherein a portion of the plurality of discrete panels that form a top of the pet enclosure are also joined to the at least one door panel, wherein the pet enclosure is at least two of the discrete flat panels high on each side, where on each side of the pet enclosure, at least two discrete flat panels of the plurality of discrete panels are joined vertically to each other by a portion of the panel connectors.

* * * * *